Dec. 12, 1961     A. G. GOULD     3,012,319
METHOD OF ELONGATING THE BANJO PORTION OF AN AXLE HOUSING
Original Filed Nov. 1, 1955     5 Sheets-Sheet 1

INVENTOR.
ARLOW G. GOULD
BY *Kenneth C. Witt*
ATTY.

INVENTOR.
ARLOW G. GOULD
BY Kenneth C. Witt
ATTY.

Dec. 12, 1961  A. G. GOULD  3,012,319
METHOD OF ELONGATING THE BANJO PORTION OF AN AXLE HOUSING
Original Filed Nov. 1, 1955  5 Sheets-Sheet 3

INVENTOR.
ARLOW G. GOULD
BY Kenneth C. Witt
ATTY.

INVENTOR.
ARLOW G. GOULD
BY
Kenneth C. Witt
ATTY.

Dec. 12, 1961 A. G. GOULD 3,012,319
METHOD OF ELONGATING THE BANJO PORTION OF AN AXLE HOUSING
Original Filed Nov. 1, 1955 5 Sheets-Sheet 5

INVENTOR.
ARLOW G. GOULD
BY Kenneth C. Witt
ATTY.

United States Patent Office 3,012,319
Patented Dec. 12, 1961

3,012,319
METHOD OF ELONGATING THE BANJO PORTION OF AN AXLE HOUSING
Arlow G. Gould, Niles, Mich., assignor to Clark Equipment Company, a corporation of Michigan
Original application Nov. 1, 1955, Ser. No. 544,221. Divided and this application Mar. 19, 1957, Ser. No. 647,034
5 Claims. (Cl. 29—552)

This invention relates to a method for forming axle housings, and more particularly to a method for elongating the banjo portion of one-piece drive axle housings for trucks, busses, passenger vehicles and the like.

The present application is a division of my copending application Serial No. 554,221, filed November 1, 1955, now Patent No. 2,937,687, dated May 24, 1960.

Heretofore axle housings of the type specified usually have been formed with circular openings in either side of the banjo frame which are adapted to permit passage therethrough of the differential gear set, for example, of any given axle drive unit. One method of making axle housings with circular openings, which has met with signal commercial success, is disclosed in expired Reissue Patent No. 20,103 to George Spatta.

In certain applications it has been found that oval, as distinguished from circular, openings in the axle housing best meet the requirements that the openings be large enough to permit passage of the gear set therethrough, and that the overall height of the housing be sufficiently small to permit adequate road clearance.

I have discovered a method for ovalizing circular openings in axle housings of the type specified by which the metal forming the banjo portion of the housing is reformed by cold forging means into a relatively elongated configuration, and the metal defining the circular openings in said housing is reshaped to define oval openings having major axes parallel to the longitudinal axis of the housing.

I carry out my method by providing a machine which includes a plurality of power actuated dies locatable within and without the banjo housing, each of said dies being actuatable in predetermined coordinated relation with each other die in such a manner that a first pair of oppositely and internally disposed identical dies move outwardly in opposite directions to predetermined positions along an axis transverse to the longitudinal axis of the housing so as to fix the final length of the minor axes of the oval openings and form the metal adjacent such axes, a second pair of oppositely and internally disposed identical dies move outwardly in opposite directions to predetermined positions along an axis parallel to the longitudinal axis of the housing to forge or reshape the banjo and ovalize the openings therein by lengthening the major axes thereof, and a third pair of oppositely and externally disposed identical dies moved inwardly in opposite directions to predetermined positions along the axis of said first pair of dies to forge or reshape the banjo and ovalize the openings therein by shortening the minor axes thereof to a length predetermined as aforementioned by said first pair of dies. In this manner there is provided a single piece forged axle housing having oval openings formed in either side of the banjo portion thereof.

It has been found that by using the above described method, ovalized banjo housings may be manufactured at considerably lower cost than by any other known method, and that said method provides the only known practical and inexpensive way of ovalizing the banjo portion of a forged single piece axle housing. It has also been found that use of my novel method and machine for the purpose described does not appreciably reduce the strength or load bearing characteristics of the axle housing.

It is therefore a primary object of this invention to provide a method for ovalizing circular openings in the banjo portion of axle housings.

Another object of this invention is to provide a method for ovalizing circular openings in the banjo portion of forged single piece axle housings by elongating the diameter of the opening along the longitudinal axis of the housing while, at the same time, shortening the diameter of the opennig transverse to the said axis of the housing.

Other objects and advantages of the present invention will become apparent to those skilled in the art from the following detailed description when taken in conjunction with the accompanying drawings wherein.

Figure 1:
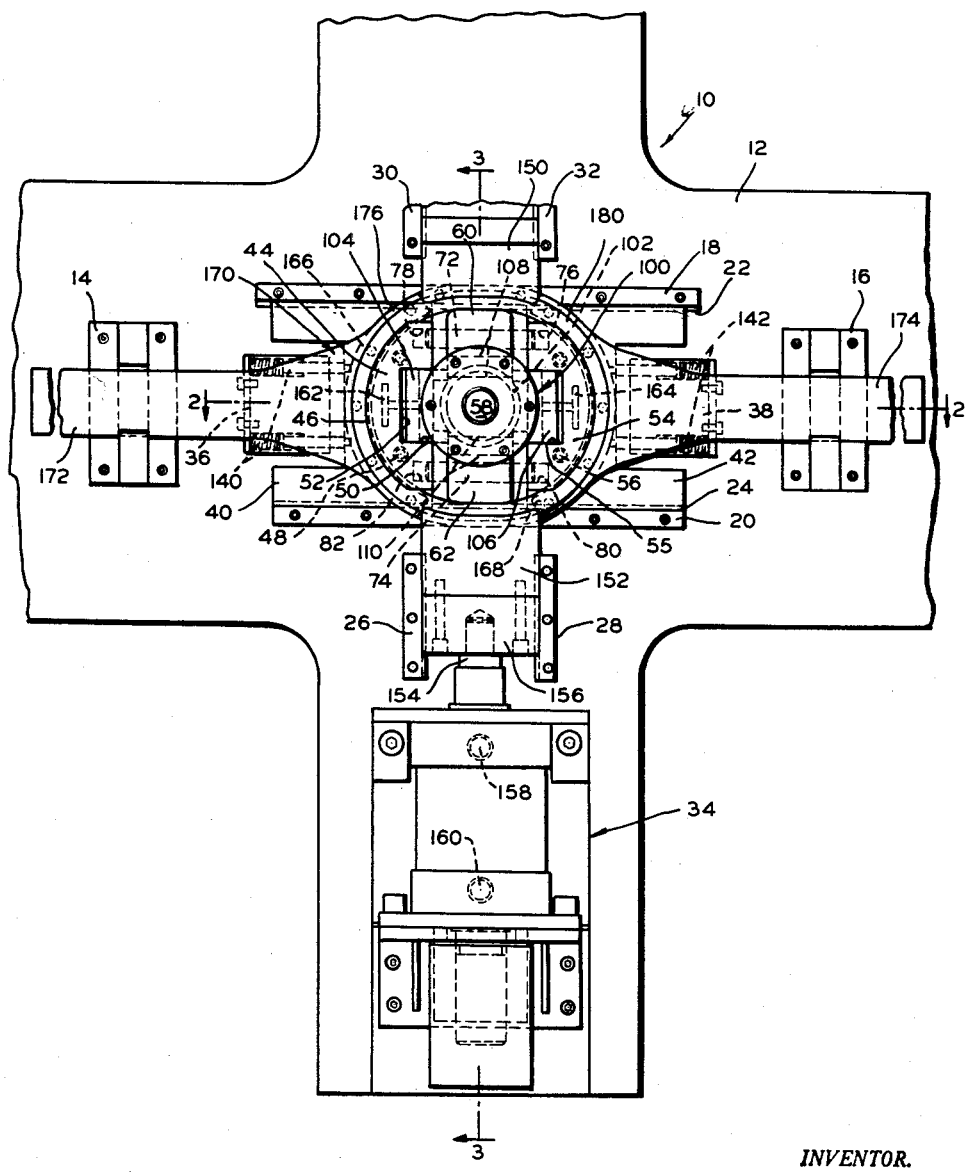
FIGURE 1 is a partial front elevation of my machine having an axle housing of the type specified shown mounted thereon with the cold forging dies of said machine disposed at the ends of their cycle of ovalizing operation.
Figure 3:
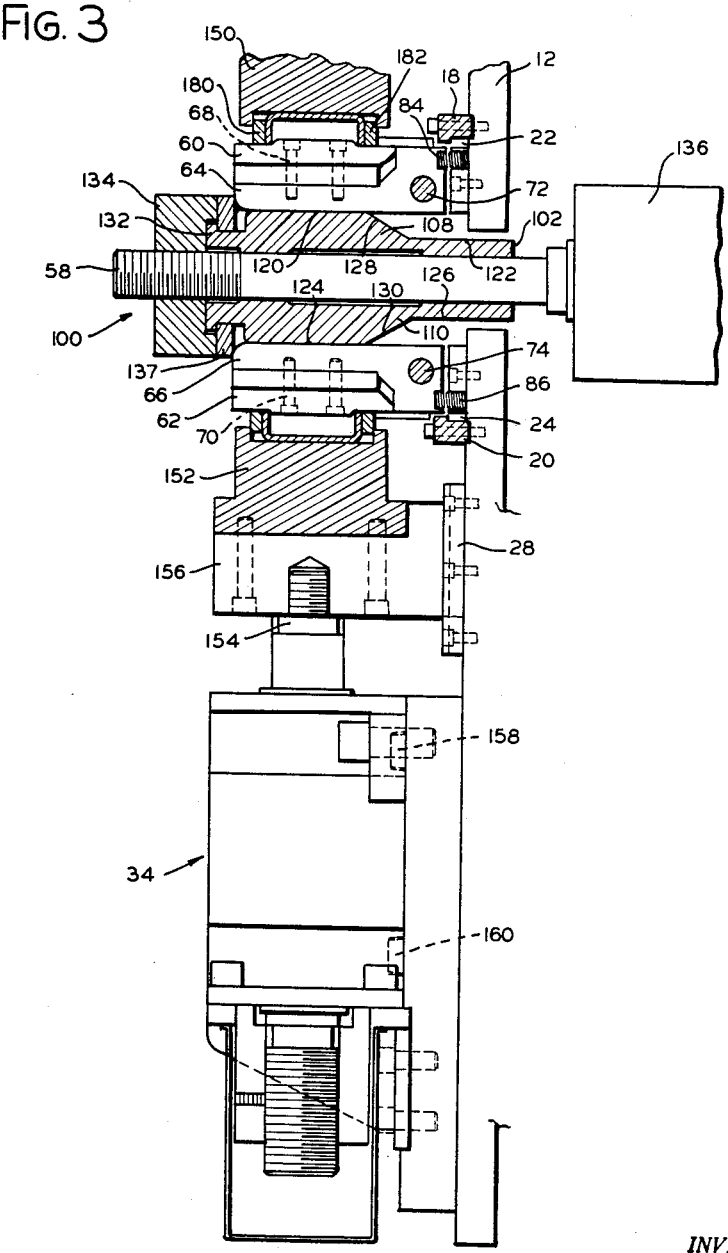
FIGURE 3 is a partial sectional view taken along line 3—3 of FIGURE 1.
Figure 6:
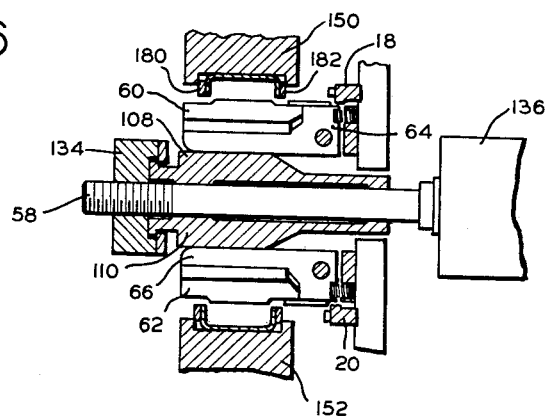
Figure 7:
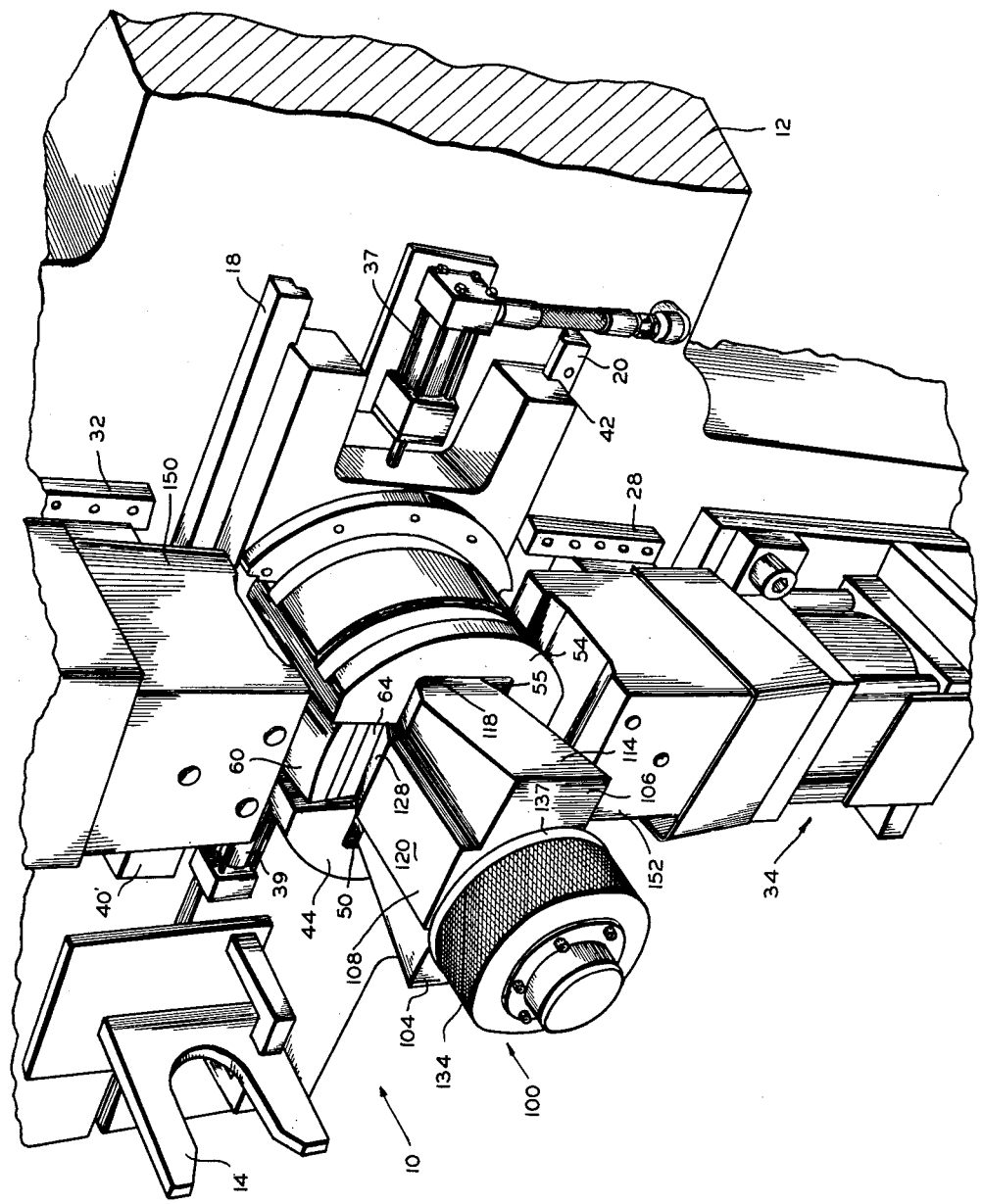

FIGURE 6 is a schematized partial sectional view of a part of the operating mechanism shown near the end of the ovalizing cycle of FIGURE 3; and FIGURE 7 is a perspective view of the main part of the machine, as shown in FIGURE 1, with one modification as explained hereinafter, taken at about a 45° angle in the upper right hand quadrant with the axle housing removed and the forging dies in non-operating positions.

Referring now to FIGURES 1, 2, 3 and 7, a cold forging machine is generally shown at numeral 10 having a support plate 12 which may be mounted on a floor supported base, not shown, in any desired position; i.e., horizontal, vertical or at any desired angle therebetween. For the purpose of the following description it will be assumed that plate 12 is mounted in a vertical position. Rigidly connected to plate member 12, as by studs, are yoke or cradle members 14 and 16 mounted in horizontally spaced relation to each other, horizontally extending and vertically spaced ways 18 and 20 having grooves or tracks 22 and 24 extending along the inner portions thereof, respectively, vertically extending and horizontally spaced ways 26, 28, and 30, 32 having vertically extending inwardly disposed tracks similar to those of ways 18 and 20, vertically extending and centrally located hydraulic piston and cylinder constructions of well known type, one of which is shown at 34, and spring loaded plunger mountings 36 and 38 (FIGURE 1) and pneumatic piston and cylinder responsive means 37 and 39 (FIGURE 7).

Two plate-like members or slides 40 and 42 are each mounted for sliding movement in the grooves 22 and 24 of ways 18 and 20. A die 44 having a convex surface 46 formed as a sector of an oval extends transversely outwardly from slide 40 and is rigidly connected thereto by bolts 48. The die 44 is formed with a longitudinal slot 50 running through the central section thereof, said slot including a flat sloping surface 52 for a purpose to be described. A die 54 identical to die 44 is connected to slide 42 by bolts 56 and is symmetrically disposed relative to die 44 about the axis of a reciprocable piston rod 58.

A second set of identical dies 60 and 62 are symmetrically disposed on opposite sides of rod 58 mid-way between dies 44 and 54 and are connected to block members 64 and 66 by bolts 68 and 70 (see FIGURE 3), said block members and dies being pivoted on stubshafts 72 and 74. The stubshaft 72 is supported at the opposite ends thereof in horizontally aligned cylindrical bores 76 and 78 in the upper part of dies 54 and 44, respectively, and the stub-shaft 74 is similarly mounted in cylindrical bores 80 and 82 disposed in the lower portion of said dies. Suitably mounted between support plate 12 and pivoted members 64 and 66 are a pair of springs 84 and 86 which urge members 64, 60 and 66, 62 about shafts 72 and 74, respectively, in counterclockwise and clockwise directions, respectively, as viewed in FIGURE 3.

A camming wedge structure 100 is mounted on piston shaft 58 for movement therewith and has projecting from a sleeve 102 thereof a first pair of integral oppositely disposed identical wedge portions 104 and 106, and a second pair of oppositely disposed identical wedge portions 108 and 110, each identical pair of said wedge portions being disposed in transverse relation to the other pair of wedge portions on the sleeve 102. The wedge portions 104 and 106 are formed with flat sloping surfaces 112 and 114, respectively, and with flat horizontal surfaces 116 and 118, respectively, and wedge portions 108 and 110 are formed with flat horizontal surfaces 120, 122 and 124, 126, respectively, and with flat sloping surfaces 128 and 130, respectively. Structure 100 is mounted on piston rod 58 so that wedges 104 and 106 register with slots 50 and 55 in dies 44 and 54, respectively, the sloping surfaces of said dies being cut at the same angle as surfaces 112 and 114 of the respective wedges. When structure 100 is mounted in this position the outer surfaces of wedge portions 108 and 110 are disposed in contact with a portion of the inner surfaces of block members 64 and 66, respectively.

Sleeve 102 terminates at the outer end thereof in a collar 132 which is held in a fixed axial position relative to rod 58 by a fitting 134 which threadedly mates with the end of said rod. An hydraulic cylinder construction 136, suitably connected to an hydraulic fluid pressure control mechanism, not shown, is adapted to actuate structure 100 with piston rod 58 in either direction along the axis of said rod. A ring 137 connected to fitting 134 by bolts 138 functions as a positive stop for inward actuation of structure 100 when the ring is moved into abutment with outer radially extending surfaces of pivoted block members 64 and 66. Opposite movement of wedge 100 is limited by a stop member, not shown, built into cylinder construction 136.

Figure 4:
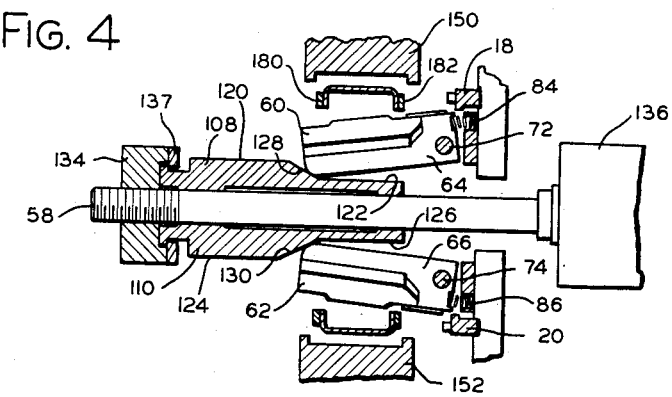
FIGURE 4 is a schematic view in partial section of a part of the operating mechanisms shown in FIGURE 3 just after the ovalizing cycle has begun.
Figure 5:
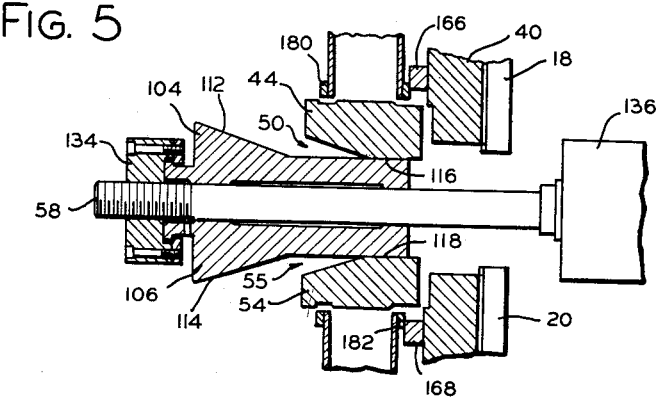
FIGURE 5 is a schematized partial section of a part of the operating mechanism shown in FIGURE 2 just after the ovalizing cycle has begun, as shown in FIGURE 4.

With the structure 100 located in its fully extended position, i.e., when the stop in cylinder 136 limits outward movement of said structure, springs 84 and 86 hold block members 64 and 66 and the die members connected thereto in an inwardly rotated position on stubshafts 72 and 74 (see FIGURE 4), in which position the outer portions of the inner surfaces of said block members abut surfaces 128 and 130 of wedge portions 108 and 110. It will also be seen that when structure 100 is in said fully extended position, surfaces 116 and 118 of wedge portions 104 and 106, respectively, contact the parallel innermost surfaces of slots 50 and 55 in dies 44 and 54, as shown in FIGURE 5.

Figure 2:
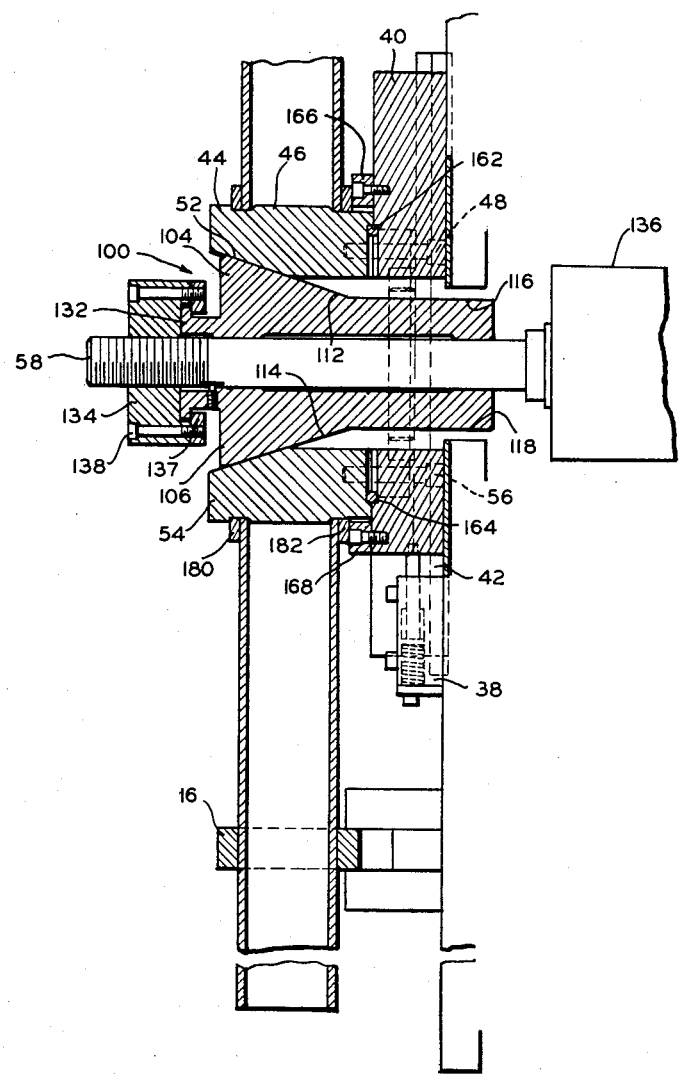
FIGURE 2 is a partial section taken along line 2—2 of FIGURE 1.

The inner surfaces of dies 44 and 54 are always maintained in contact with a portion of the outer contoured surfaces of wedge portions 104 and 106 by two pairs of spring loaded plunger sets 140 and 142 mounted in supports 36 and 38, respectively, as shown in FIGURES 1 and 2, or by pneumatic actuators 39 and 37, respectively, as shown in FIGURE 7, as an alternate construction said plunger sets or actuators, as the case may be, being operatively connected to slide members 40 and 42, respectively, to urge same, along with dies 44 and 54, inwardly towards the axis of piston shaft 58. It is apparent that the manner of loading each of dies 44, 54, 60, and 62 effects continuous contact between the respective inner surfaces of the dieblocks with the corresponding outer surfaces of wedge portions 104, 106, 108, and 110, respectively.

When cylinder 136 is energized to retract piston rod 58 from its fully extended position, structure 100 moves inwardly with said rod to expand the various dies outwardly in the following manner: (a) Sloping surfaces 128 and 130 of wedge portions 108 and 110 first rotate dies 60 and 62 outwardly about stubshafts 72 and 74 as said surfaces are moved towards cylinder 136, during which time dies 44 and 54 remain in their initial positions in contact with the extended flat surfaces 116 and 118 of wedge members 104 and 106; (b) continued retraction of piston rod 58 causes dies 60 and 62 to fully traverse sloping surfaces 128 and 130 and be thereafter maintained in an outer fixed horizontal position by surfaces 120 and 124, during traverse of which latter surfaces dies 44 and 54 are actuated outwardly in opposite directions by sloping surfaces 112 and 114 of wedge portions 104 and 106 which move inwardly through slots 50 and 55 of said dies; and (c) Full outward movement of dies 44 and 54 occurs when stop member 137 is actuated into contact with block members 64 and 66. It should be noted that outward actuation of dies 44 and 54 begins at the moment when dies 60 and 62 are actuated out of contact with sloping surfaces 128 and 130 and into contact with surfaces 120 and 124 of wedge portions 108 and 110. The relationship between the positions of the two pairs of die members is illustrated in FIGURES 4 and 5, wherein outward movement of dies 60 and 62 has just begun while dies 44 and 54 remain in their inwardmost positions on surfaces 116 and 118 of wedge members 104 and 106.

A third pair of outwardly disposed dies 150 and 152 are reciprocably actuatable by fluid pressure cylinder means, such as shown at 34, to move inwardly in opposite directions towards dies 60 and 62 in ways 30, 32 and 26, 28, respectively. Die 152 is shown connected to a piston rod 154 of cylinder means 34 by a connecting block 156 bolted thereto. Passages 158 and 160 are disposed at opposite ends of cylinder means 34 for conducting pressurized fluid to one side or the other of a piston, not shown. Inward movement of dies 150 and 152 by the connected cylinder means is initiated in predetermined timed relation by a control mechanism, not shown, so that the beginning of such movement is simultaneous with or just behind the beginning of outward expanding movement of dies 44 and 54. Preferably, the beginning of inward movement of dies 150 and 152 is approximately one second behind the beginning of outward movement of dies 44 and 54, although, obviously, such timing may be varied as desired. Dies 150 and 152 continue to move inwardly until outward movement of dies 44 and 54 ceases, as determined by the position of contact between ring stop member 137 and members 64 and 66, at which time a solenoid valve in the control mechanism, not shown, is automatically energized to reverse the direction of fluid flow into cylinder means 34 and 136, thereby causing outward movement of structure 100 with piston rod 58 and outward movement of piston rods 154 which permits inward radial movement of the four inner dies and outward radial movement of the two outer dies.

Grease runs 162 and 164 are located between the slide 40 and die 44 and between the slide 42 and die 54, and terminate at the inner surfaces of said dies for insuring proper lubrication between wedge portion 104 an die 44, and between wedge 106 and die 54, respectively.

A stop member 166, in the form of a ring sector, is bolted to slide 40, and a similar stop member 168 is bolted to slide 42 for a purpose to be described.

When each of the six described dies is in a fully collapsed position, as shown in FIGURES 4, 5 and 7, an axle housing 170 having oppositely extending arms 172 and 174, a banjo housing or frame 176, and rings 180 and 182 aligned with and welded to the outer faces of the opposite sides of the banjo frame, made in accordance with, for example, the method disclosed in the Spatta Reissue Patent 20,103, supra, may be placed in the cold forging machine 10 by approximately aligning the circular openings in the banjo housing 176 with piston rod 58 and then slightly lifting the entire housing to place arms 172 and 174 in the cradles of yokes 14 and 16. The yokes are so positioned on supporting plate 12 that when the axle housing is centered thereon, the axis of revolution of the banjo frame 176 is in substantial alignment with the axis of piston rod 58. The inner mounted position of axial housing 170 on the forging machine 10 is determined by the position of contact between ring 182 and stop members 166 and 168.

To ovalize the banjo housing and the circular openings therein, the machine 10 is put into operation, following which the following sequence of operations occur: Cylinder means 136 begins to retract structure 100 to first actuate dies 60 and 62 outwardly to predetermined positions as fixed by the rise of wedge portions 108 and 110 between surfaces 122 and 120, and 126 and 124, in which positions dies 60 and 62 are a predetermined distance away from or out of contact with the adjacent inner surface portions of the banjo housing; substantially simultaneously with departure of said dies from the sloping faces 128 and 130 of said wedge portions, dies 44 and 54 move outwardly into contact with the adjacent inner surfaces of the banjo housing along the sloping surfaces 112 and 114 of wedge portions 104 and 106, respectively; and simultaneously with initial contact between said latter mentioned dies and the banjo housing, or within one to three seconds thereafter, as preferred, cylinder means 34 and another, not shown, are energized to actuate dies 150 and 152 into contact with portions of the outer surfaces of the banjo housing adjacent to the latter dies. Retraction of structure 100 and inward movement of dies 150 and 152 continues until stop member 136 contacts pivoted block members 64 and 66, as before explained, by which time the load on cylinder means 136, which is, in practice, in the order of 50 tons, and the load exerted on the upper and lower portions of the banjo housing by dies 150 and 152 have caused a reshaping of the banjo housing into the form shown in FIGURE 1.

In practice, this cold forging process effects, in a given model of axle housing, an elongation of approximately two inches of the original diameter of the circular opening in the banjo along the longitudinal axis of the housing, and a decrease or shortening of the original diameter by approximately three-quarters inch along the transverse housing diameter.

It will be noted that inward pressure on the housing portions adjacent dies 150 and 152 continues until said housing portions are in contact with the formed ends of predeterminately positioned dies 60 and 62, at which time dies 44 and 54 have reached full extension. As hereinbefore explained, a solenoid valve is automatically energized at this time to reverse the movements of the cylinder means, which then actuate the various dies away from the respective adjacent surfaces of the banjo housing, following which the axle housing 170 may be removed from the machine 10.

The surfaces of each die of the pairs of dies 60, 62 and 150, 152, which are actuatable into forging relation with the corresponding inner and outer surfaces of the banjo housing, are substantially straight and flat so that upper and lower sections of predetermined extension of said banjo housing are cold forged into substantially straight sections, whereas the surface engaging portions of dies 44 and 54 are formed in substantially elliptical sections. The resultant configuration of the openings in the banjo housing is substantially elliptical.

It will be noted that each of the six die members utilized in reforming the banjo frame 176 of the axle housing 170 are readily removable from adjacent supporting members. This arrangement permits various die inserts to be used as desired for cold forging the banjo frame into more or less elliptical or other shapes as desired. In addition, it is apparent that my machine may be readily designed to accommodate axle housing of widely varying size and configuration, and that the same novel method is applicable to reforming the shape of the banjo frames of housings of such varying size and shape.

It will also be apparent to those skilled in the art that numerous modifications in structure and the arrangement of parts may be made without departing from the scope of my invention.

I claim:

1. A method of ovalizing circular banjo sections of banjo frame axle housings, which comprises the steps of suitably mounting the housing in a forging machine, predetermining a final minor axis of an ovalized opening in the banjo section by expanding a pair of inner dies, progressively forging opposite ends of said banjo section outwardly along the longitudinal axis of the axle housing to a predetermined major axis length of the oxalized opening in the banjo section, and forging other oppositely disposed portions of said banjo housing inwardly along an axis transverse to said longitudinal axis to said predetermined minor axis length.

2. A method as claimed in claim 1 wherein the steps of lengthening and shortening the major and minor axes, respectively, of the ovalized opening are performed in a continuous operation.

3. The method of reshaping the banjo section of a banjo axle housing, which comprises moving a first pair of dies within the section outwardly to predetermine the ultimate extent of the section along an axis transverse to the longitudinal axis of the housing, moving a second pair of dies within the section outwardly to elongate the section along an axis longitudinally of the housing, and moving a third pair of dies located outside of the housing inwardly to reduce the extent of the section along the first said axis to the predetermined amount in cooperation with the said first pair of dies.

4. The method of elongating an opening in the banjo section of a banjo axle housing, which comprises locating three pairs of dies in operative relation adjacent the housing with two of said pairs located within the opening and the other pair located adjacent the banjo section but on the outside, and in a continuous operation moving a first pair of the said inner pairs of dies outwardly to predetermine the extent of the elongated and narrowed opening along the minor axis, moving the other inner pair of dies outwardly to elongate the opening along the major axis longitudinally of the housing, and moving the outer pair of dies inwardly to reduce the extent of the opening along the said minor axis to the predetermined amount in cooperation with the said first pair of inner dies.

5. The method of elongating and narrowing circular openings in the banjo section of a one-piece banjo axle housing which comprises the steps of locating three pairs of forging dies adjacent the housing in operative relation thereto, the first two of said pairs being inner dies arranged to operate within the said banjo section, the first inner pair of dies being arranged to move away from each other and laterally of the longitudinal axis of the axle housing toward the sides of the banjo section, the second pair of inner dies being arranged to move away from each other and longitudinally of the axle housing, and the third pair of dies being located externally of the axle housing and adjacent the said sides of the banjo section and arranged to move toward each other, and in a continuous operation moving the said first pair of inner dies outwardly to predetermine the ultimate extent of the banjo section along a transverse minor axis, moving the second pair of inner dies outwardly to elongate the banjo section along a major axis longitudinally of the housing, and moving the said third pair of dies inwardly to reduce the extent of the banjo section along the said minor axis to the predetermined amount in cooperation with the said first pair of dies.

References Cited in the file of this patent

UNITED STATES PATENTS

| | | |
|---|---|---|
| 1,091,751 | Morgan et al. | Mar. 31, 1914 |
| 1,455,188 | Cox | May 15, 1923 |
| 1,652,630 | Mogford et al. | Dec. 13, 1927 |
| 1,920,302 | Grotnes | Aug. 1, 1933 |
| 2,133,092 | Gettig | Oct. 11, 1938 |
| 2,398,373 | Grotnes | Apr. 16, 1946 |
| 2,659,407 | Kay | Nov. 17, 1953 |
| 2,678,620 | Cote | May 18, 1954 |